US010530715B2

(12) United States Patent
Cho

(10) Patent No.: US 10,530,715 B2
(45) Date of Patent: Jan. 7, 2020

(54) METHOD FOR SYNCHRONIZING MESSAGES AMONG PLURALITY OF TERMINALS, MACHINE-READABLE STORAGE MEDIUM, AND SERVER

(71) Applicant: Samsung Electronics Co., Ltd., Gyeonggi-do (KR)

(72) Inventor: Eun-Ah Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 106 days.

(21) Appl. No.: 14/140,093

(22) Filed: Dec. 24, 2013

(65) Prior Publication Data

US 2014/0181228 A1 Jun. 26, 2014

(30) Foreign Application Priority Data

Dec. 24, 2012 (KR) .................. 10-2012-0152463

(51) Int. Cl.
*H04L 12/58* (2006.01)
*H04L 29/08* (2006.01)

(52) U.S. Cl.
CPC .............. *H04L 51/04* (2013.01); *H04L 51/24* (2013.01); *H04L 67/1095* (2013.01)

(58) Field of Classification Search
CPC ...... H04L 67/1095; H04L 51/04; H04L 51/24
USPC ................... 709/204, 206, 217, 238
See application file for complete search history.

(56) References Cited

U.S. PATENT DOCUMENTS

2002/0165000 A1    11/2002  Fok
2003/0046433 A1*   3/2003   Luzzatti ............ G06F 17/30581
                                                          709/248
2004/0019695 A1*   1/2004   Fellenstein .......... G06Q 10/107
                                                          709/239
2004/0267963 A1    12/2004  Whynot
2010/0011317 A1    1/2010   Lee
2010/0216495 A1*   8/2010   Kristiansson ........... H04L 51/04
                                                          455/466
2011/0099366 A1*   4/2011   Kalliola ................ G06F 21/606
                                                          713/153

(Continued)

FOREIGN PATENT DOCUMENTS

CN    102333069    1/2012
CN    102461099    5/2012

(Continued)

OTHER PUBLICATIONS

Chinese Office Action dated Dec. 14, 2017 issued in counterpart application No. 201310722622.0, 24 pages.

(Continued)

*Primary Examiner* — Chirag R Patel
*Assistant Examiner* — Marshall M McLeod
(74) *Attorney, Agent, or Firm* — The Farrell Law Firm, P.C.

(57) ABSTRACT

Provided is a method for synchronizing messages among a plurality of terminals, including receiving a communication message from a first sending terminal, sending a message notifying reception of the communication message to a first receiving terminal that is not connected to a server among receiving terminals mapped to a receiving account of the communication message, and sending the communication message to the first receiving terminal, if the first receiving terminal is connected to the server.

18 Claims, 12 Drawing Sheets

(56) References Cited

U.S. PATENT DOCUMENTS

| | | |
|---|---|---|
| 2011/0153745 A1 | 6/2011 | Limont et al. |
| 2012/0058786 A1 | 3/2012 | Schatunayr |
| 2013/0067013 A1* | 3/2013 | Dgani ..................... H04L 29/06 |
| | | 709/206 |

FOREIGN PATENT DOCUMENTS

| | | |
|---|---|---|
| KR | 1020120006097 | 1/2012 |
| WO | WO 2011/148370 | 12/2011 |

OTHER PUBLICATIONS

Korean Decision of Grant dated May 28, 2019 issued in counterpart application No. 10-2012-0152463, 6 pages.

\* cited by examiner

| Key: UID | msg_id | sender | sessionid | receiver | server | port | message | timestamp |
|---|---|---|---|---|---|---|---|---|
| | $msg_id | $userid | $sessionid | $userid,... | $server | $num | $message | $time |
| | 410 | 420 | 430 | 440 | 450 | 460 | 470 | 480 |

Columns 440–480 are grouped under $timeUUID.

FIG.10

METHOD FOR SYNCHRONIZING MESSAGES AMONG PLURALITY OF TERMINALS, MACHINE-READABLE STORAGE MEDIUM, AND SERVER

PRIORITY

This application claims priority under 35 U.S.C. § 119(a) to Korean Patent Application Serial No. 10-2012-0152463, which was filed in the Korean Intellectual Property Office on Dec. 24, 2012, the content of which is incorporated herein by reference.

BACKGROUND OF THE INVENTION

1. Field of the Invention

The present invention relates generally to a message service system that provides an environment for transmitting and receiving messages among a plurality of terminals, and more particularly, to a message synchronization (or sync) method among a plurality of terminals in a system for providing a message-based real-time communication (or chatting) service.

2. Description of the Related Art

In a conventional system for providing a message service, only one mobile terminal is registered in one account and only limited message sync is provided. In addition, conventional message sync merely retrieves, in a mobile terminal, messages stored in a database server for backup.

With the recent proliferation of mobile environment advances, an increasing amount of users own multiple mobile terminals. This has caused more techniques to be developed for mapping a plurality of terminals to one user account.

Therefore, a need exists for a method for synchronizing or sharing reception or transmission messages among a plurality of terminals corresponding to one user account in a multi-device environment where the plurality of terminals are mapped to the user account.

The above information is presented as background information only to assist with an understanding of the present disclosure. No determination has been made, and no assertion is made, as to whether any of the above might be applicable as prior art with regard to the present invention.

SUMMARY OF THE INVENTION

The present invention has been made to at least partially solve, alleviate, or remove at least one of problems and/or disadvantages described above.

Accordingly, aspects of the present invention provide a method for synchronizing or sharing reception or transmission messages among a plurality of terminals corresponding to one user account in a multi-device environment where the plurality of terminals are mapped to the user account.

According to an aspect of the present invention, there is provided a method for synchronizing messages among a plurality of terminals, including receiving a communication message from a first sending terminal, sending a message notifying reception of the communication message to a first receiving terminal that is not connected to a server among receiving terminals mapped to a receiving account of the communication message, and sending the communication message to the first receiving terminal, if the first receiving terminal is connected to the server.

According to another aspect of the present invention, there is provided a server for synchronizing messages among a plurality of terminals, including a communication module configured to communicate with the plurality of terminals, a storing unit configured to store accounts and information about terminals mapped to the respective accounts, and a controller configured to receive a communication message from a first sending terminal, send a message notifying reception of the communication message to a first receiving terminal that is not connected to a server among receiving terminals mapped to a receiving account of the communication message, and send the communication message to the first receiving terminal if the first receiving terminal is connected to the server.

According to another aspect of the present invention, there is provided a receiving terminal comprising a communication module configured to communicate with a server, and a controller configured to receive a message notifying reception of a communication message from the server which has received the communication message from a sending terminal, control a screen of the receiving terminal to display the message notifying reception of the communication message, control the communication module to connect to the server and receive the communication message from the server.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 10 illustrates a structure of a communication message stored in a user/terminal inbox, according to an embodiment of the present invention;

Throughout the drawings, like reference numerals will be understood to refer to like parts, components, and structures.

DETAILED DESCRIPTION OF EMBODIMENTS OF THE PRESENT INVENTION

Figure 1:
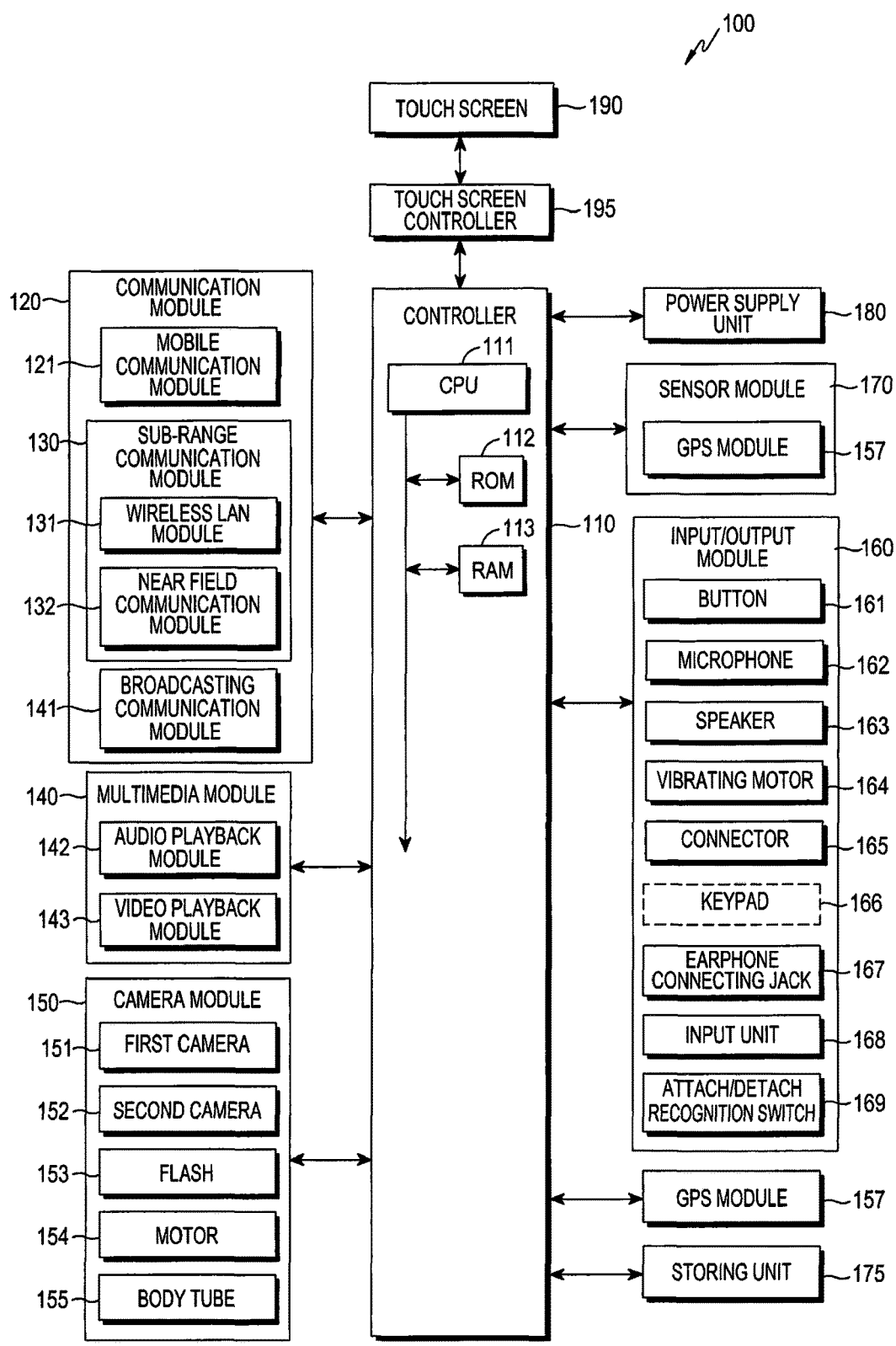
FIG. 1 is a block diagram of a terminal according to an embodiment of the present invention.

Hereinafter, various embodiments of the present invention are described in detail with reference to the accompanying drawings. Detailed descriptions of well-known functions and structures incorporated herein will be omitted to avoid obscuring the subject matter of the present invention.

Although ordinal numbers such as "first", "second", and so forth will be used to describe various components, those components are not limited by the terms. The terms are used only for distinguishing one component from another component. For example, a first component is referred to as a second component and likewise, a second component is also referred to as a first component, without departing from the teaching of the inventive concept. The term "and/or" used herein includes any and all combinations of one or more of the associated listed items.

The terminology used herein is for the purpose of describing embodiments only and is not intended to be limiting. As used herein, the singular forms are intended to include plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a commonly used dictionary have meanings coinciding with those of terms in the related technology. As long as the terms are not defined obviously, they are not ideally or excessively analyzed as formal meanings.

The present invention is applied to a message service system that provides an environment for transmitting and receiving messages among a plurality of terminals, and the present invention is also applied to a system for providing a message-based real-time chatting service.

The real-time communication system is implemented by a plurality of terminals for transmitting or receiving messages through a real-time communication application and at least one server for performing message delivery between the plurality of terminals.

The present invention relates to a message sync method among a plurality of terminals, and more particularly, to a method for synchronizing or sharing reception messages or transmission messages among a plurality of terminals corresponding to one user account in a multi-device environment where the plurality of terminals are mapped to the user account. In the present invention, the user account may also be referred to as a user identifier (or a user unique identifier).

In the following description, a first server, which is a real-time communication server, and a second server, which is a push server, are described as examples of the at least one servers, but the second server could be integrated into the first server and the first server could be referred to as a server, a real-time chatting server, or a message server. The server and the terminal are referred to as a server device and a terminal device, respectively, and the server and the terminal are physically separated devices which communicate each other over a network such as a mobile communication network, a wireless network, or a wired network, and the server and the terminal are defined as separate devices which wirelessly communicate with each other.

In the present invention, the terminal is an arbitrary service capable of implementing a real-time communication service through communication with the server or another terminal, and the terminal is referred to as, for example, a portable terminal, a mobile terminal, a communication terminal, a portable communication terminal, or a portable mobile terminal.

For example, the terminal is a smart phone, a cellular phone, a game console, a Television (TV), a display device, a vehicle head unit, a notebook computer, a laptop computer, a tablet computer, a Personal Media Player (PMP), or a Personal Digital Assistant (PDA). The terminal is implemented as a pocket-size portable communication terminal having a wireless communication function.

In the present invention, the server is an arbitrary device capable of implementing a real-time communication service through communication with at least one terminal or another server. At least one server transmits a real-time communication application to a terminal at the request of the terminal, transmits update data for updating a message application or a real-time communication application installed in the terminal to the terminal, or transmits a message received from a particular terminal to at least one terminal, at preset intervals or at the request of the terminal. The server stores a user account, user account information such as a terminal identifier registered, linked, or mapped to the user account, and reception and transmission messages corresponding to the user account, and transmits a push message for message sync to the terminal.

The server is one of or a combination of various servers, such as a real-time communication server for providing a message-based real-time communication service among a plurality of terminals, a cloud server for data sync between the plurality of terminals, a web server for providing an Internet Protocol (IP)-based data service, a database server for data search and provisioning, a push server for transmitting a push message, a message server for providing a message service, and an update server for providing update data of an application.

The message sync method according to the present invention is implemented by the server, and a representative structure of the terminal and a representative structure of the server will be described below.

The representative structure of the terminal is a cellular phone, in which some components could be omitted or changed when necessary. For example, if the terminal is a computer, a sensor module or a vibration element is omitted and a touch screen is replaced with a general Liquid Crystal Display (LCD) having no touch sensor function.

FIG. 1 is a block diagram of a terminal 100 according to an embodiment of the present invention.

Referring to FIG. 1, the terminal 100 is connected with an external electronic device (not illustrated) by using at least one of a communication module 120, a connector 165, and an earphone-connecting jack 167. The external electronic device includes one of various devices which are removable from the portable terminal 100 and are connectible with the portable terminal 100 in a wired manner, such as an earphone, an external speaker, a Universal Serial Bus (USB) memory, a charging device, a cradle/dock, a Digital Multimedia Broadcasting (DMB) antenna, a mobile payment-related device, a health management device (such as a blood pressure monitor), a game console, and a vehicle navigation device. The external electronic device includes a wirelessly connectible Bluetooth® communication device, a Near Field Communication (NFC) device, a WiFi Direct communication device, and a wireless Access Point (AP). The portable terminal 100 is connected with another terminal or server, such as one of a cellular phone, a smart phone, a tablet Personal Computer (PC), a desktop PC, and a server, in a wired or wireless manner.

Referring to FIG. 1, the terminal 100 includes at least one touch screen 190 and at least one touch screen controller 195. The portable terminal 100 also includes a controller 110, the communication module 120, a multimedia module 140, a camera module 150, an input/output module 160, a sensor module 170, a storing unit 175, and a power supply unit 180.

The communication module 120 includes a mobile communication module 121, a sub-range communication module 130, and a broadcast communication module 141.

The sub-range communication module 130 includes at least one of a Wireless Local Area Network (WLAN) module 131 and a near field communication module 132. The multimedia module 140 includes at least one of an audio playback module 142 and a video playback module 143. The camera module 150 includes a first camera 151 and a second camera 152. In addition, depending on the primary usage of the terminal 100, the camera module 150 of the portable terminal 100, according to the present invention, includes at least one of a body tube 155 for zoom-in/zoom-out operations of the first camera 151 and the second camera 152, a motor 154 for controlling motion of the body tube 155 for the zoom-in/zoom-out operations of the body tube 155, and a flash 153 for providing a light source for photographing. The input/output module 160 includes a button 161, a microphone 162, a speaker 163, a vibrating motor 164, a connector 165, and a keypad 166.

The controller 110 includes a Read Only Memory (ROM) 112 in which a control program for controlling the portable terminal 100 is stored, and a Random Access Memory (RAM) 113 which memorizes a signal or data input to or output from a Central Processing Unit (CPU) 111 or is used as a memory region for a task performed in the terminal 100. The CPU 111 includes a single core, a dual core, a triple core, or a quad core processor. The CPU 111, the ROM 112, and the RAM 113 are interconnected through an internal bus (not shown).

The controller 110 controls the communication module 120, the multimedia module 140, the camera module 150, the input/output module 160, the sensor module 170, the storing unit 175, the power supply unit 180, the touch screen 190, and the touch screen controller 195.

The controller 110 senses a user input generated when a touchable user input means, such as an input unit 168 or the user's finger, touches one of a plurality of objects displayed on the touch screen 190, approaches the object, or is disposed in proximity to the object. The controller 110 also identifies the object corresponding to the position on the touch screen 190 where the user input is sensed.

The user input generated through the touch screen 190 includes one of a direct touch input for directly touching an object and a hovering input, which is an indirect touch input in which the object is approached within a preset recognizing distance but is not directly touched. For example, when the input unit 168 is positioned close to the touch screen 190, an object positioned immediately under the input unit 168 is selected. In the present invention, the user input includes a gesture input generated through the camera module 150, a switch/button input generated through the at least one button 161 or the keypad 166, and a voice input generated through the microphone 162 as well as the user input generated through the touch screen 190.

The object is displayed on the touch screen 190 of the portable terminal 100, and includes at least one of, for example, an application, a menu, a function item (or a menu item), a document, a widget, a picture, a moving image, an e-mail, a Short Message Service (SMS) message, and a Multimedia Messaging Service (MMS) message. The object is selected, executed, deleted, canceled, stored, and changed using the user input means. The object is used as a concept including a button, a shortcut icon, a thumbnail image, and a folder including at least one object in the terminal 100. In the present invention, an item indicates an executable function, such as an icon, or a function item constituting a particular menu. The function item is presented in the form of an icon or a text, for example. The menu may also be used as a term indicating a function item.

The shortcut icon is displayed on the touch screen 190 of the terminal 100 for quick execution of an application, a call, a phone book, or a menu, for example. Upon input of a command or a selection for executing the shortcut icon, a corresponding application is executed.

The controller 110 senses a user input event, such as a hovering event, when the input unit 168 approaches the touch screen 190 or is disposed in close proximity to the touch screen 190.

The terminal 100 includes at least one of the mobile communication module 121, the WLAN module 131, and the near field communication module 132.

The mobile communication module 121 facilitates the connection between the terminal 100 and an external device through mobile communication by using one or more antennas (not illustrated) under control of the controller 110. The mobile communication module 121 transmits/receives a wireless signal for a voice call, a video call, a text message (Short Messaging Service: SMS), and/or a multimedia message (Multi Media Service: MMS) with a cellular phone (not illustrated), a smart phone (not illustrated), a tablet PC, or another electronic device (not illustrated) which has a phone number input into the terminal 100.

The sub-range communication module 130 includes the WLAN module 131 and the near field communication module 132. Alternatively, the sub-range communication module 130 includes either the WLAN module 131 or the short-range communication module 132, or both.

The WLAN module 131 is connected to the Internet in a place where a wireless AP (not illustrated) is installed, under control of the controller 110. The WLAN module 131 supports the wireless LAN standard IEEE802.11x of the Institute of Electrical and Electronics Engineers (IEEE). The near field communication module 132 wirelessly performs short-range communication between the terminal 100 and an external electronic device under control of the controller 110. The near field communication includes Bluetooth®, infrared data association (IrDA), WiFi-Direct communication, or NFC communication.

The broadcast communication module 141 receives a broadcast signal (for example, a TV broadcast signal, a radio broadcast signal, or a data broadcast signal) and broadcast additional information (for example, Electronic Program Guide (EPG) or Electronic Service Guide (ESG)) transmitted from a broadcasting station (not shown) via a broadcast communication antenna (not illustrated) under control of the controller 110.

The multimedia module 140 includes the audio playback module 142 or the video playback module 143. The audio playback module 142 plays a digital audio file (for example, a file having a file extension such as 'mp3', 'wma', 'ogg', or 'way') stored in the storing unit 175 or received under control of the controller 110. The video playback module 143 plays a digital video file (for example, a file having a file extension such as 'mpeg', 'mpg', 'mp4', 'avi', 'mov', or 'lnky') stored or received under control of the controller 110. The multimedia module 140 is integrated into the controller 110.

The camera module 150 includes the first camera 151 and the second camera 152 which capture a still image or a video under control of the controller 110. The camera module 150 also includes the body tube 155 for performing the zoom-in/zoom-out operations for photographing, the motor 154 for controlling motion of the body tube 155, and the flash 153 for providing an auxiliary light source necessary for photographing. The first camera 151 is positioned on the front surface of the terminal 100, and the second camera 152 is positioned on the rear surface of the terminal 100. In another embodiment, the first camera 151 and the second camera 152 are positioned adjacent to each other (for example, a space between the first camera 151 and the second camera 152 is greater than 1 cm and less than 8 cm) to capture a three-dimensional (3D) still image or a 3D moving image.

Each of the first camera 151 and the second camera 152 includes a lens system and an image sensor, for example. The first camera 151 and the second camera 152 convert an optical signal (input or captured) through the lens systems into an electric image signal and output the electric image signal to the controller 110. The user captures a moving image or a still image through the first camera 151 and the second camera 152.

The input/output module 160 includes the at least one button 161, the microphone 162, the speaker 163, the vibrating motor 164, the connector 165, the keypad 166, the earphone-connecting jack 167, and the input unit 168. However, it should be noted that the input/output module 160 is not limited to those examples, and a cursor control such as a mouse, a track ball, a joy stick, or a cursor direction key could be provided to control movement of a cursor on the touch screen 190.

The buttons 161 are formed on at least one of a front surface, a side surface, and a rear surface of a housing (or case) of the terminal 100, and includes at least one of a power/lock button, a volume button, a menu button, a home button, a back button, and a search button.

The microphone 162 receives voice or sound and generates a corresponding electric signal under control of the controller 110.

The speaker 163 outputs sound corresponding to various signals or data (for example, wireless data, broadcast data, digital audio data, and digital video data) under control of the controller 110. The speaker 163 outputs sound corresponding to a function executed by the terminal 100 (for example, button manipulation sound corresponding to a phone call, a ring back tone, or voice of a counterpart user). One or more speakers 163 are formed in one or more proper positions of the housing of the terminal 100.

The vibrating motor 164 converts an electric signal into mechanical vibration under control of the controller 110. For example, the vibrating motor 164 operates in a vibration mode in the terminal 100, if a voice call or a video call from another device (not illustrated) is received. One or more vibrating motors 164 are disposed in the housing of the portable terminal 100. The vibrating motor 164 operates in response to user input generated through the touch screen 190.

The connector 165 is used as an interface for connecting the terminal 100 with an external device (not illustrated) or a power source (not illustrated). Under control of the controller 110, data stored in the storing unit 175 of the terminal 100 is transmitted to an external electronic device or is received from the external electronic device through a wired cable connected to the connector 165. The terminal 100 receives power from the power source through the wired cable connected to the connector 165 or may charge a battery (not illustrated) by using the power source.

The keypad 166 receives key input from the user for control of the terminal 100. The keypad 166 includes a physical keypad (not illustrated) formed in the terminal 100 or a virtual keypad (not illustrated) displayed on the touch screen 190. The physical keypad (not illustrated) formed in the mobile terminal 100 is excluded according to the capability or structure of the terminal 100.

An earphone (not illustrated) is inserted into the earphone-connecting jack 167 to be connected to the terminal 100.

The input unit 168 is inserted into the terminal 100 for storage, and is withdrawn or separated from the portable terminal 100 for use. An attach/detach recognition switch 169 is disposed in a region of an inner side of the terminal 100 into which the input unit 168 is inserted, to provide a signal corresponding to attachment or detachment of the input unit 168 to the controller 110. The attach/detach recognition switch 169 is configured to be in direct or indirect contact with the input unit 168 when the input unit 168 is mounted. Thus, the attach/detach recognition switch 169 generates the signal corresponding to attachment or detachment of the input unit 168 (that is, a signal for indicating the attachment or detachment of the input unit 168) based on whether it contacts the input unit 168, and outputs the signal to the controller 110.

The sensor module 170 includes at least one sensor for detecting a state of the terminal 100. For example, the sensor module 170 includes at least one of a proximity sensor for detecting the user's proximity with respect to the terminal 100, an illumination sensor (not illustrated) for detecting an amount of light around the terminal 100, a motion sensor (not illustrated) for detecting an operation of the terminal 100 (for example, rotation of the terminal 100 or acceleration or vibration applied to the terminal 100), a geo-magnetic sensor (not illustrated) for detecting an orientation of the terminal 100 by using the Earth's magnetic field, a gravity sensor for detecting a working direction of the gravity, an altimeter for measuring an atmospheric pressure to detect an altitude, and a Global Positioning System (GPS) module 157.

The GPS module 157 receives electric waves from a plurality of GPS satellites (not illustrated) in the Earth's orbit, and calculates a location of the terminal 100 by using a time of arrival from the GPS satellite (not illustrated) to the terminal 100.

The storing unit 175 stores a signal or data which is input/output corresponding to operations of the communication module 120, the multimedia module 140, the input/output module 160, the sensor module 170, or the touch screen 190, under control of the controller 110. The storing unit 175 also stores a control program and applications for control of the terminal 100 and/or the controller 110.

The term "storing unit" includes the storing unit 175, the ROM 112 and the RAM 113 in the controller 110, or a memory card (not illustrated) mounted in the terminal 100 (for example, a Secure Digital (SD) card or a memory stick). The storing unit 175 includes a non-volatile memory, a volatile memory, a Hard Disk Drive (HDD), or a Solid State Drive (SSD).

The storing unit 175 also stores applications of various functions such as a real-time communication application, navigation, video communication, games, an alarm application based on time, images for providing a Graphic User Interface (GUI) related to the applications, user information, documents, databases or data related to a method for processing touch inputs, background images (e.g., a menu screen and a standby screen), operation programs necessary for driving the terminal 100, messages received or sent through a real-time communication application, and images captured by the camera module 150. The storing unit 175 is a machine, for example, a non-transitory computer-readable medium. The term "machine-readable medium" includes a medium for providing data to the machine to allow the machine to execute a particular function. The storing unit 175 includes non-volatile media or volatile media. Such a medium needs to be of a tangible type so that commands delivered to the medium can be detected by a physical tool that reads the commands with the machine.

The machine-readable medium includes, but is not limited to, at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash EPROM.

The power supply unit 180 supplies power to one or more batteries disposed in the housing of the terminal 100 under control of the controller 110. The one or more batteries supply power to the terminal 100. The power supply unit 180 also supplies power input from an external power source through the wired cable connected with the connector 165 to the terminal 100. The power supply unit 180 also supplies power to the terminal 100, which is wirelessly input from an external power source using a wireless charging technique.

The terminal 100 includes the touch screens 190, which provide a user graphic interface corresponding to various services (for example, call, data transmission, broadcasting, and picture taking) to users.

The touch screen 190 outputs an analog signal, which corresponds to at least one input to the user graphic interface, to the touch screen controller 195.

The touch screen 190 receives at least one user input through a user's body (for example, a finger including a thumb) or the input unit 168 (for example, a stylus pen or an electronic pen).

The touch screen 190 also receives a continuous movement of one touch (i.e., a drag input). The touch screen 190 outputs an analog signal corresponding to the received continuous movement of the touch to the touch screen controller 195.

In the present invention, a touch also includes a non-contact touch (for example, when the user input means is positioned within a distance of, for example, 1 cm) in which the user input means is detected without a direct contact with the touch screen 190. The touch also includes a direct contact between the touch screen 190 and a finger or the touch input unit 168. A distance or interval from the touch screen 190 within which the user input means is detected is changed according to the capability or structure of the terminal 100. In particular, to separately detect a direct touch event based on a contact with the user input means and an indirect touch event (i.e., a hovering event), the touch screen 190 is configured to output different values for values (for example, an analog voltage value or current value) detected in the direct touch event and the hovering event.

The touch screen 190 is implemented as, for example, a resistive type, a capacitive type, an infrared type, an acoustic wave type, an Electromagnetic Resonance (EMR) type, or a combination thereof.

The touch screen 190 includes at least two touch panels capable of sensing a touch, an approach of a finger, or the input unit 168 to receive inputs generated by the finger or the input unit 168. The at least two touch panels provide different output values to the touch screen controller 195. Thus, the touch screen controller 195 differently recognizes the values input from the at least two touch screen panels to identify whether the input from the touch screen 190 is the input generated by the finger or by the input unit 168.

The touch screen controller 195 converts the analog signal received from the touch screen 190 into a digital signal, which it transmits to the controller 110. The controller 110 controls the touch screen 190 by using the digital signal received from the touch screen controller 195. For example, the controller 110 controls a shortcut icon (not illustrated) displayed on the touch screen 190 to be selected or executed in response to a direct touch event or a hovering event. The touch screen controller 195 is included in the controller 110.

The touch screen controller 195, by detecting a value (for example, an electric-current value) output through the touch screen 190, recognizes a hovering interval or distance as well as a user input position and converts the recognized distance into a digital signal (for example, a Z-coordinate), which it then sends to the controller 110. The touch screen controller 195 may also, by detecting the value output through the touch screen 190, detect a pressure applied by the user input means to the touch screen 190, convert the detected pressure into a digital signal, and provide the digital signal to the controller 110.

Figure 2:
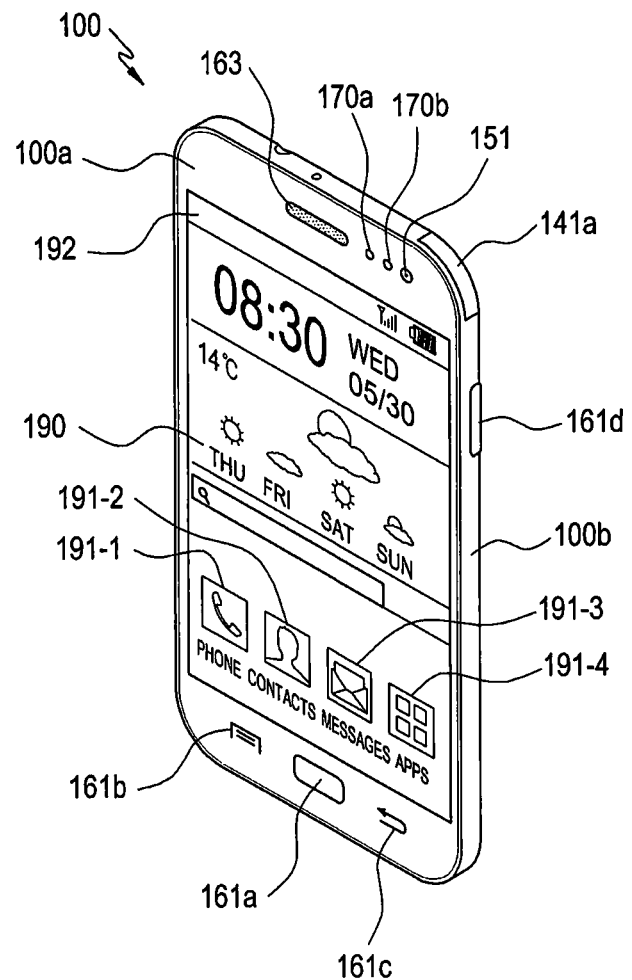
FIG. 2 is a frontal view of a terminal according to an embodiment of the present invention.
Figure 3:
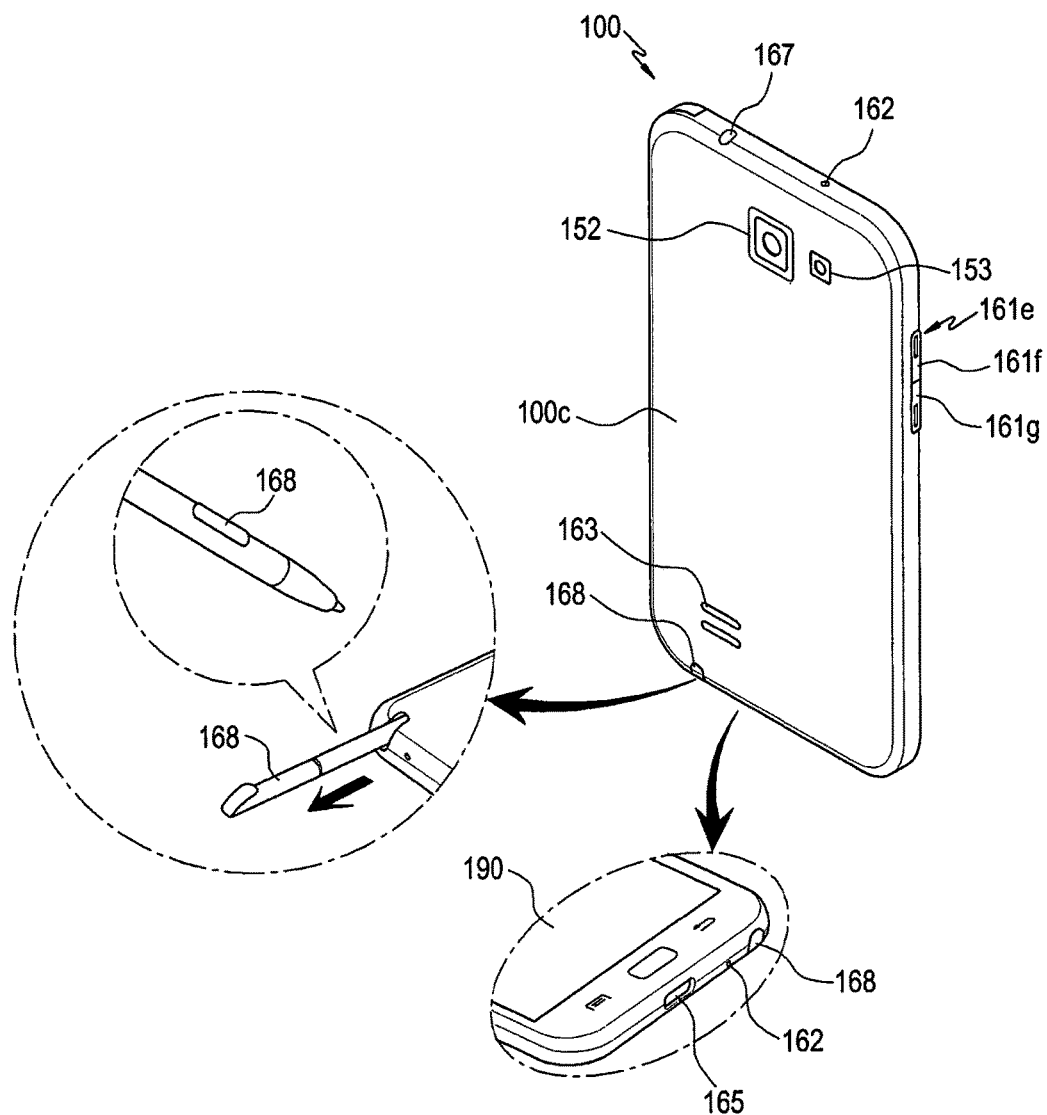
FIG. 3 is a rear view of a terminal according to an embodiment of the present invention.

FIG. 2 is a frontal view of the terminal 100 according to an embodiment of the present invention, and FIG. 3 is a rear view of the terminal 100 according to an embodiment of the present invention.

Referring to FIGS. 2 and 3, the touch screen 190 is disposed in the center of a front surface 100a of the terminal 100. The touch screen 190 is large enough to occupy most of the front surface 100a of the terminal 100. FIG. 2 shows an example in which a main home screen is displayed on the touch screen 190. The main home screen is an initial screen displayed on the touch screen 190 when the terminal 100 is powered on. When the terminal 100 has different home screens of several pages, the main home screen is the first home screen among the home screens of the several pages. Shortcut icons 191-1, 191-2, and 191-3 for executing frequently used applications, a main menu change key 191-4, time, weather, and so forth are displayed on the home screen. If the user selects the main menu change key 191-4, a menu screen is displayed on the touch screen 190. A status bar 192 indicating a state of the terminal 100, such as a battery charge state, a strength of a received signal, and a current time, is formed in an upper portion of the touch screen 190.

A home button 161a, a menu button 161b, and a back button 161c are disposed in a lower portion of the touch screen 190.

The home button 161a is intended to display the main home screen on the touch screen 190. For example, when any home screen, which is different from the main home screen, or a menu screen is displayed on the touch screen 190, the main home screen is displayed on the touch screen 190 upon selection of the home button 161a. If the home button 161a is selected during execution of applications on the touch screen 190, the main home screen illustrated in FIG. 2 is displayed on the touch screen 190. The home button 161a is used to display recently used applications or a task manager on the touch screen 190.

The menu button 161b provides a connection menu that is displayed on the touch screen 190. The connection menu includes, for example, a widget add menu, a background change menu, a search menu, an edit menu, and an environment-setting menu.

The back button 161*c* is used to display a screen that was displayed immediately before the currently executed screen or to terminate the most recently used application.

The first camera 151, an illumination sensor 170*a*, and a proximity sensor 170*b* are disposed on an edge of the front surface 100*a* of the terminal 100. The second camera 152, the flash 153, and the speaker 163 are disposed on a rear surface 100*c* of the terminal 100.

A power/lock button 161*d*, a volume button 161*e*, a terrestrial DMB antenna 141*a* for broadcasting reception, and one or more microphones 162 are disposed on a lateral surface 100*b* of the terminal 100. The DMB antenna 141*a* is fixed to or removable from the terminal 100.

The connector 165, in which multiple electrodes are formed and are connected with an external device in a wired manner, is formed in a lower-end lateral surface of the terminal 100. The earphone-connecting jack 167, into which the earphone is inserted, is formed in an upper-end lateral surface of the terminal 100.

The input unit 168, which is stored by insertion into the terminal 100 and is withdrawn and separated from the terminal 100 for use, is mounted/formed on the lower-end larger surface of the terminal 100.

Figure 4:
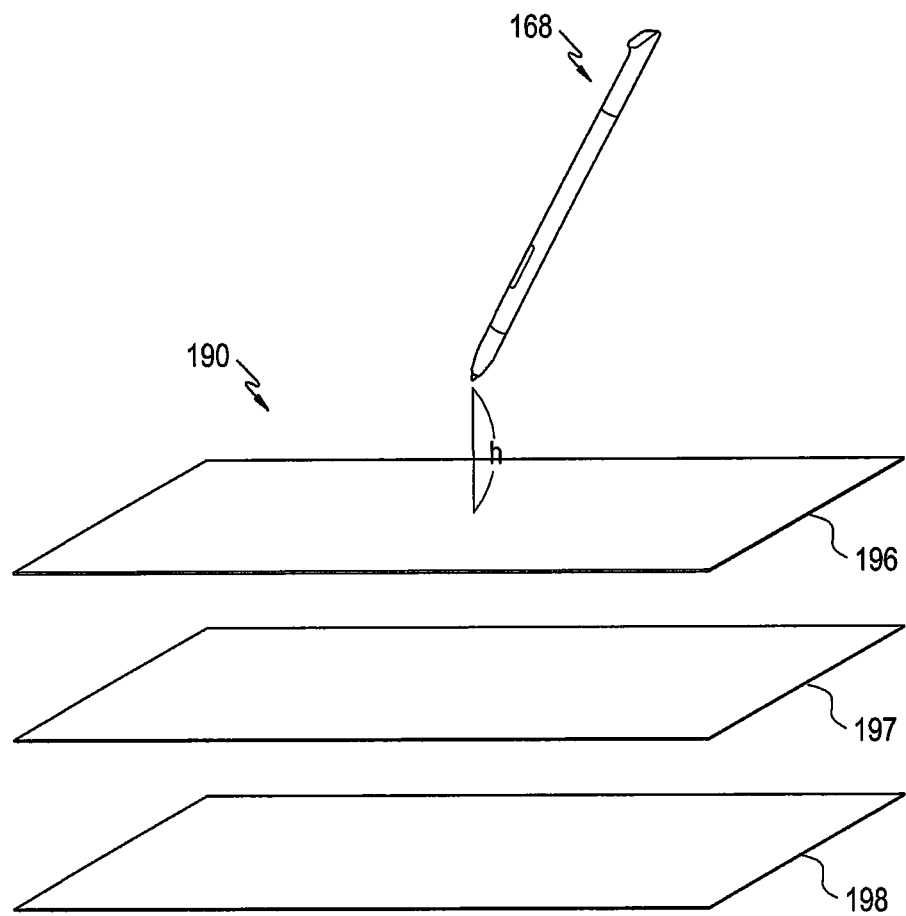
FIG. 4 illustrates a touch screen according to an embodiment of the present invention.

FIG. 4 illustrates the touch screen 190 according to an embodiment of the present invention.

Referring to FIG. 4, the touch screen 190 includes a first touch panel 196 for sensing a finger input, a display panel 197 for screen display, and a second touch panel 198 for sensing a pen input, which are sequentially stacked from top to bottom by being closely adhered to one another or partially spaced apart from one another. The first touch panel 196 may also be disposed under the display panel 197.

The display panel 197 includes multiple pixels through which an image is displayed. A Liquid Crystal Display (LCD), an Organic Light Emitting Diode (OLED), or an LED is used for the display panel 197. The display panel 197 displays various operation states of the terminal 100, various images corresponding to execution of applications or services, and a plurality of objects.

The first touch panel 196 includes a window exposed on the front surface of the terminal 100 and a sensor layer attached to a bottom surface of the window to recognize information (e.g., position and strength) of the finger input. The sensor layer forms a sensor for recognizing a position of a finger contact on the surface of the window, and to this end, the sensor layer has preset patterns. The sensor layer has various patterns such as, for example, a linear latticed pattern, and a diamond-shape pattern. To perform a sensor function, a scan signal having a preset waveform is applied to the sensor layer, and if the finger contacts the surface of the window, a sensing signal whose waveform is changed by a capacitance between the sensor layer and the finger is generated. The controller 110 analyzes the sensing signal, thereby recognizing whether and where the finger contacts the surface of the window.

In another embodiment, the first touch panel 196 is manufactured by a) coating a thin metallic conductive material (for example, an Indium Tin Oxide (ITO) layer) onto both surfaces of the window to allow electric current to flow on the surface of the window and b) coating a dielectric, which is capable of storing electric charges, onto the coated surfaces. Once the finger touches the surface of the first touch panel 196, an amount of electric charges moves to the touched position by static electricity, and the first touch panel 196 recognizes the amount of change of current corresponding to movement of the electric charges, thus sensing the touched position.

Any type of touch capable of generating static electricity is sensed through the first touch panel 196.

The second touch panel 198 is an Electromagnetic Resonance (EMR) type, and includes an electronic induction coil sensor having a grid structure in which a plurality of loop coils intersect one another and an electronic signal processor for sequentially providing an alternating current signal having a predetermined frequency to the respective loop coils of the electronic induction coil sensor. If the input unit 168 having a resonance circuit embedded therein is placed near the loop coil of the second touch panel 198, a signal transmitted from the loop coil generates electric current based on mutual electromagnetic induction in the resonance circuit of the input unit 168. The resonance circuit of the input unit 168 generates and outputs an induction signal based on the electric current.

The second touch panel 198 detects the induction signal by using the loop coil, thus sensing an input position (i.e., a hovering input position or a direct touch position) of the input unit 168. The second touch panel 198 also senses a height h from the surface of the touch screen 190 to a pen point 430 of the input unit 168. The induction signal output from the input unit 168 has a frequency that varies according to a pressure applied by the input unit 168 to the surface of the touch screen 190. The pressure (i.e., a pen pressure) of the input unit 168 is sensed based on the frequency.

An input means capable of generating electric current based on electromagnetic induction is sensed through the second touch panel 198.

Figure 5:
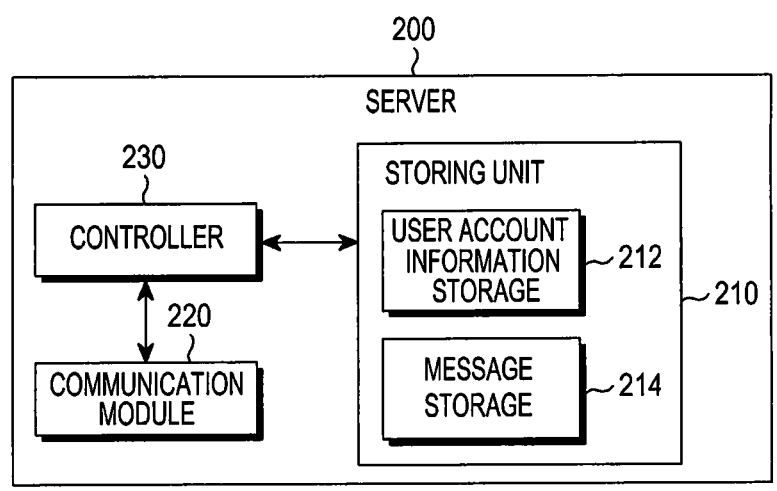
FIG. 5 is a block diagram of a server according to an embodiment of the present invention.

FIG. 5 is a block diagram of a server 200 according to an embodiment of the present invention.

The server 200 relates to a real-time communication server, and some components included in the representative structure of the terminal 100 could be added thereto.

The server 200 includes a storing unit 210, a communication module 220, and a controller 230.

The storing unit 210 includes a user account information storage 212 for storing account information and a message storage 214 for storing messages. The storing unit 210 may further include an application storage for storing a message or real-time communication application. The storages are in one storing unit or are separate devices.

The user account information storage 212 stores personal information for a plurality of users, environment-setting information for a real-time communication service for the plurality of users, and user account information such as user accounts (for example, user identifiers) for the plurality of users, a password for each user account, a terminal unique identifier of a terminal registered or mapped to each user account, and connection information of the mapped terminal. A user account indicates a unique identifier of a user registered in a server to be provided with a real-time communication service. For example, the user account is AAA,AAA@BCDEFG.COM. The terminal's unique identifier is a phone number or an account assigned by the server 200 (for example, AAA1, AAA/AAA1, AAA/AAA1@BCDEFG. COM, or AAA@BCDEFG.COM/AAA1). In this example, the terminal's unique identifier indicates a phone number or a network address identified as a message sender/receiver on the network, and thus the terminal's unique identifier is referred to as a network identifier.

In the present invention, one user account is shared by the plurality of terminals, but the plurality of terminals may also have their own terminal accounts and the server 200 may manage the terminal accounts with a single unified user account.

Connection information includes at least one of information such as whether each terminal is currently connected with the server 200, session information if the terminal is currently connected to the server 200 (for example, a session identifier and terminal/user account information of a terminal/user joining a session), time in which the terminal is recently connected with the server (logon time), and time in which the terminal is recently disconnected from the server (logout time).

The message storage 214 has storing areas divided to correspond to a plurality of user accounts or a plurality of terminals. For example, the message storage 214 has first through third storing areas corresponding to first through third user accounts. In another manner, the first through third storing areas are assigned to first through third user accounts. The storing area is referred to as an inbox. For example, if first through third terminals are mapped to the first user account, the first storing area (that is, the first user inbox) is divided into first through third sub storing areas (that is, first through third terminal inboxes). The controller 230 stores a message to be transmitted to a terminal, which is not connected to the server 200, in the message storage 214.

The communication module 220 performs wired or wireless communication with a terminal under control of the controller 230, and the controller 230 performs connection with the terminal, message transmission between the plurality of terminals, message storage between the plurality of terminals, and message sync between the plurality of terminals by using the communication module 220 and/or the storing unit 210.

Figure 6:
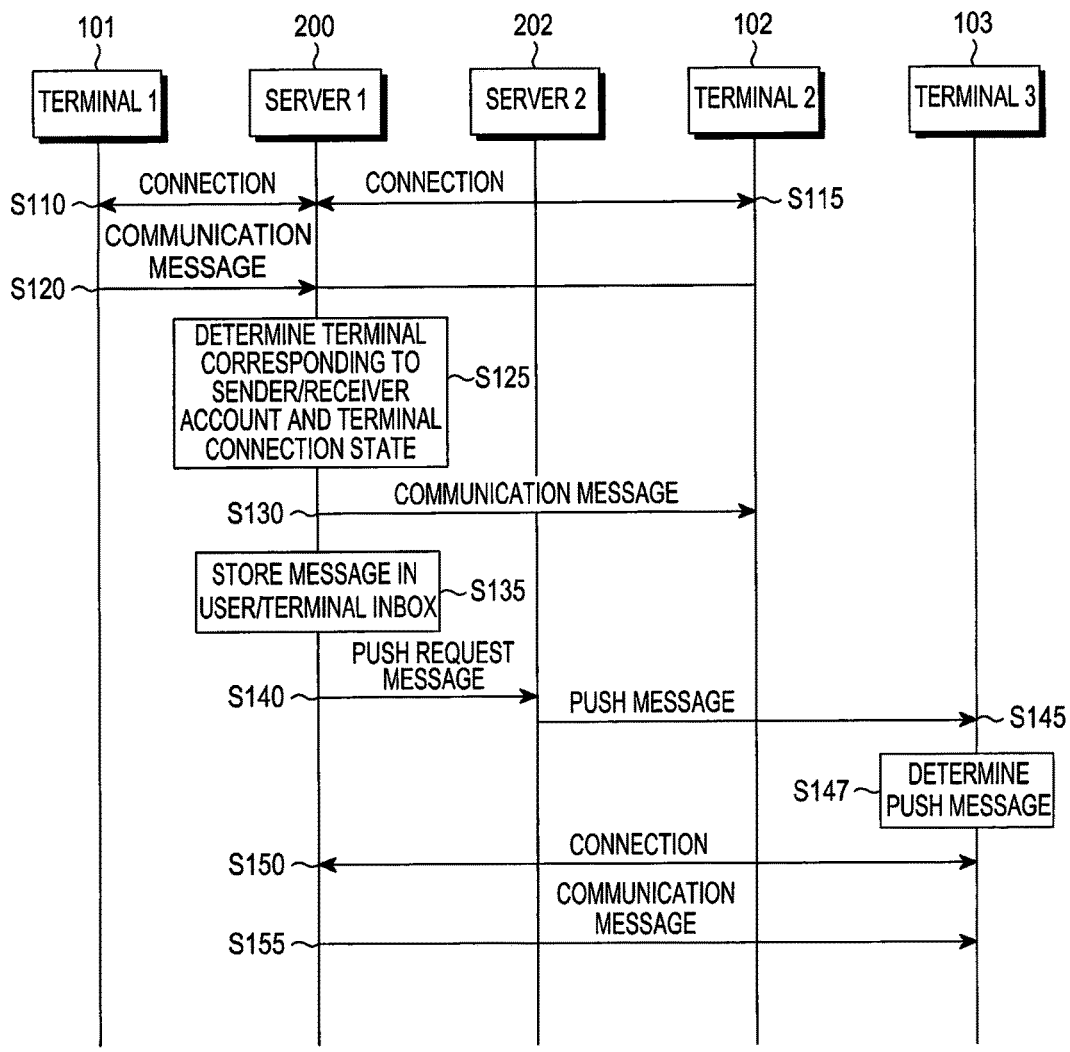
FIG. 6 is a signal flow for describing a method for synchronizing reception messages according to an embodiment of the present invention.

FIG. 6 is a signal flow for describing a method for synchronizing reception messages according to an embodiment of the present invention. In this example, a first user is a single user who owns a first terminal 101 and has a first user account registered in a first server 200. A second user is a multi-user who owns a second terminal 102 and a third terminal 103, and has a second user account registered in a second server 202.

Steps S110 through S155 illustrate a method for synchronizing reception messages.

The first through third terminals 101-103 have the same structure illustrated in FIG. 1, and the first server 200 is a real-time communication server and has the same structure as illustrated in FIG. 5. The second server 202 is a push server and has the same or similar structure as illustrated in FIG. 5. For example, the second server 202 includes a communication module for performing wired or wireless communication with the first server 200 or a terminal under control of a controller, a storing unit for storing a push request message or data thereof, and the controller for generating a push message and transmitting the generated push message to a terminal by using the communication module and/or the storing unit. The second server 202 is integrated into the first server 200, and the first server 200 performs both its unique function and a function of the second server 202.

Referring to FIG. 6, step S110 teaches connection between the first terminal 101 and the first server 200, in which the first terminal 101 attempts connection with the first server 200 according to a user input or automatically, and the first server 200 performs authentication with respect to the first terminal 101 based on authentication information (for example, a first user account and a first password) received from the first terminal 101 and permits connection with the first terminal 101 if authentication is successful. Session connection between the first terminal 101 and the first server 200 is established, and the first server 200 transmits a session identifier to the first terminal 101 and the session identifier is used for data transmission between the first terminal 101 and the first server 200 after session connection. That is, data (messages or data frames) transmitted between the first server 200 and the first terminal 101 includes the session identifier. Data is transmitted between the first terminal 101 and the first server 200 without the aforementioned authentication procedure during session connection. The session identifier is regarded as a chat room (or chat window or dialog box) identifier.

Figure 7:
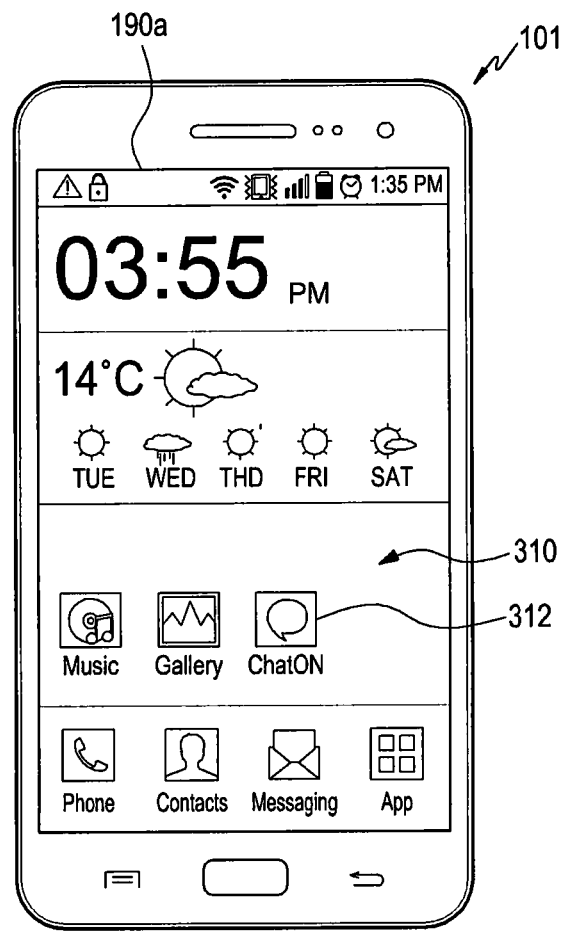
FIGS. 7, 8, and 9 illustrate screens providing a method for synchronizing reception messages according to an embodiment of the present invention.

Referring to FIG. 7, a first user of the first terminal 101 executes a first chat-on application by selecting (that is, clicking) an icon 312 for displaying a real-time communication application (in this example, a first chat-on application) on a home screen 310 of the touch screen 190a.

To select the first chat-on application, the first user presses a button through an input/output module, selects a chat-on application in another manner through the touch screen 190a, performs input of a preset pattern (for example, a double tap, an action of pinching two fingers together or apart, or an action of drawing a circle while touching the touch screen 190a by one finger), inputs a voice command through a microphone, performs input of a gesture or a motion through a camera module, or wirelessly inputs a particular command through the communication module.

Alternatively, the first chat-on application is automatically executed without an execution command of the first user, according to setting of the first user or default setting.

Referring back to FIG. 6, step S115 teaches connection between the second terminal 102 and the first server 200, in which the second terminal 102 attempts connection with the first server 200. In this connection step, the first terminal 101 specifies a terminal (the second terminal in the current example) with which the first terminal 101 desires to talk, and the first server 200 transmits a push message including information about the first server 200 and a session identifier to the second terminal 102 through the second server 202. The second terminal 102 attempts connection with the first server 200, in response to the push message. The first server 200 performs authentication with respect to the second terminal 102 based on authentication information (for example, a second user account and a second password) received from the second terminal 102, and then permits connection with the second terminal 102 if authentication is successful. Session connection between the second terminal 102 and the first server 200 is established, and after the session connection, a session identifier is used for data transmission between the second terminal 102 and the first server 200. The first through third terminals 101-103 share the same session identifier.

Step S120 teaches sending a first communication message, in which the first user inputs message contents (that is, a message text) on a chat-on application screen, and the first chat-on application of the first terminal 101 generates and transmits the first communication message including the message contents, which is destined to the second user.

Figure 8:
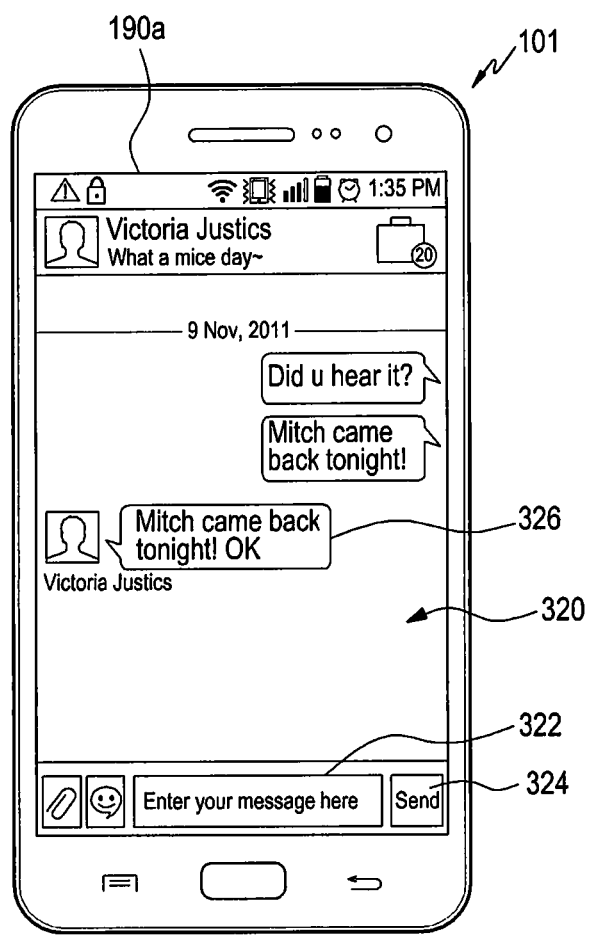

Referring to FIG. 8, the first user inputs message contents 326 onto a message input window 322 of a chat-on application screen 320 and clicks a send button 324. Once the first user clicks the send button 324, the first chat-on application of the first terminal 101 generates a first communication message including the message contents 326 and transmits the first communication message to the second user through the first server 200. The first communication message includes sender information, receiver information, message contents, and at least one of a session identifier, a service/ application type, and first server information. The sender information is a first user account, or a unique identifier of the first terminal, and the receiver information is a second user account, or a unique identifier of the second terminal 102 or the third terminal 103.

The service/application type indicates a real-time communication service (in this example, a chat-on service) or a real-time communication application (in this example, a chat-on application), and the first server information indicates a unique identifier of the first server 200 or a network identifier. In this example, messages transmitted between different objects are distinguished as first and second communication messages, but the first and second communication messages have the same contents and are referred to as communication messages. That is, although the communication messages are different in their formats or additional information except for message contents, they have the same message contents.

Step S125 teaches determining a terminal corresponding to a sender/receiver account and a terminal connection state, in which the first server 200 determines a sender and a receiver from the first communication message received from the first terminal 101, determines account information of the first user who is a sender, and determines account information of the second user who is a receiver. The first server 200 determines, from the first user account information, that only the first terminal 101 is mapped to the first user account, and determines, from the first user account information, whether the first terminal 101 is currently connected to the first server 200. The first server 200 determines, from the second user account information, that the second terminal 102 and the third terminal 103 are mapped to the second user account, and determines, from the second user account information, whether the second terminal 102 and the third terminal 103 are currently connected to the first server 200, respectively.

In the present invention, the first server 200 generates a second communication message including message contents of the first communication message, sends the second communication message to its currently connected terminal, and sends a push message to a terminal which is not currently connected thereto through the second server 202. In other words, in the present invention, the first server 200 in real time forwards or sends a received communication message to its currently connected terminal, and sends a push message to a terminal which is not currently connected thereto.

Step S130 teaches sending the second communication message, in which the first server 200 sends the second communication message to the second terminal 102 that is currently connected thereto. The second communication message is the same as the first communication message, and the second communication message includes sender information, receiver information, message contents, and at least one of a session identifier, a service/application type, and first server information. The sender information is the first user account or the unique identifier of the first terminal 101, and the receiver information is the second user account or the unique identifier of the second terminal 102. The first server 200 sends the communication message by using a Transmission Control Protocol (TCP).

Figure 9:
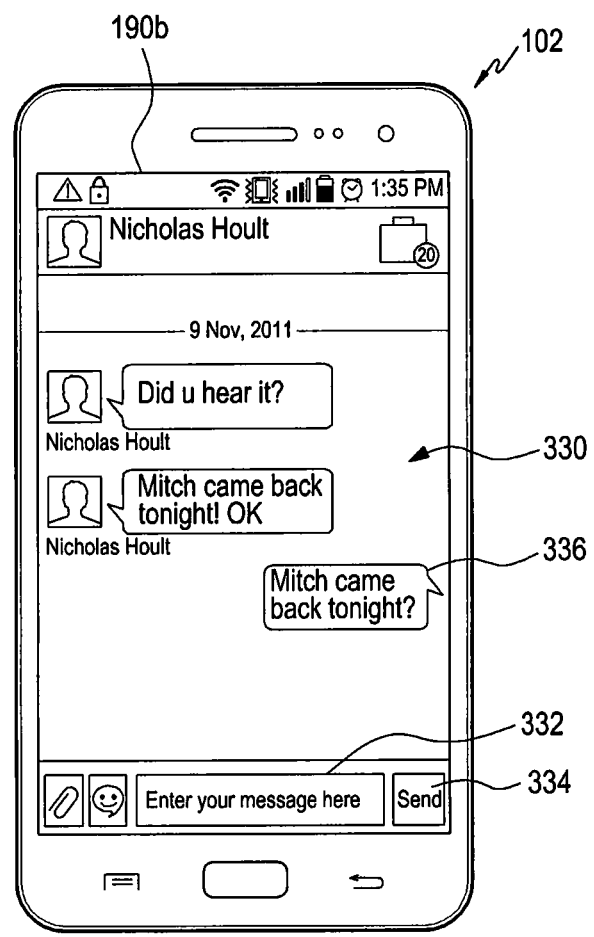

Referring to FIG. 9, the second user of the second terminal 102 determines message contents the first user sends on a chat-on application screen 330 of a touch screen 190b. Message transmission and reception between the first user and the second user is repetitively performed. For example, the second user inputs different message contents on a message input window 332 of the chat-on application screen 330. Once the second user clicks a send button 334, the second chat-on application of the second terminal 102 generates and sends a communication message including message contents, which is destined to the first user.

Step S135 teaches storing messages in a user/terminal inbox, in which the first server 200 stores the second communication message in a second user inbox or a third terminal inbox of the storing unit 210 for message sync of the third terminal 103 which is not currently connected thereto.

FIG. 10 illustrates a structure of a communication message stored in a user/terminal inbox.

"UID" and "$timeUUID" are used as a key value for the first server 200 to identify/search for a communication message stored in a user/terminal inbox, and the key value is a combination of "UID" and "$timeUUID". "UID" indicates a unique identifier of a sending terminal, and "$timeUUID" indicates time in which the communication message is stored in the user/terminal inbox. Instead of "UID", a sender account (that is, a sending account) is used as a key value.

The communication message includes a message identifier field "msg_id" 410, a sender field "sender" 420, a session identifier field "sessionid" 430, a receiver field "receiver" 440, a server field "server" 450, a port field "port" 460, a message field "message" 470, and a timestamp field "timestamp" 480. The message identifier field 410 includes an identifier "$msg_id" of the communication message, which is assigned by the first server 200. The sender field 420 includes a unique identifier "$userid" of the sending terminal or the sender account. The session identifier field 430 includes a session identifier "$sessionid". The receiver field 440 includes a unique identifier "$userid" or a receiver account, and the receiver field 440 may also include a plurality of unique identifiers or receiver accounts (that is, receiving accounts) for a plurality of receiving terminals.

The server field 450 includes a unique identifier "$server" (for example, an IP address) of the first server 200. The port field 460 includes a port number "$num" used by the first server 200 for communication with the receiving terminal. The message field 470 includes message contents $message. The timestamp field 480 includes time "$time" in which the first server 200 sends the communication message to the receiving terminal. The timestamp is used for the receiving terminal having received the communication messages to arrange and display communication messages in time series on the chat-on application screen.

Step S140 teaches requesting transmission of the push message, in which the first server 200 sends a push request message for requesting transmission of the push message including message contents to the third terminal 103 to the second server 202. The push request message includes at least one of sender information, receiver information, first server information, and message contents. The first server information includes a unique identifier of the first server 200.

Step S145 teaches sending the push message, in which the second server 202 sends the push message to the third terminal 103. The push message includes at least one of sender information, receiver information, first server information, and message contents. The push message notifies reception/transmission of a message without displaying message contents, or includes the entire message contents or some of them.

Step S147 teaches determining the push message, in which the second user determines the push message received in the third terminal 103, and determines whether to determine the message contents or the entire push message.

Figures 11A, 11B:
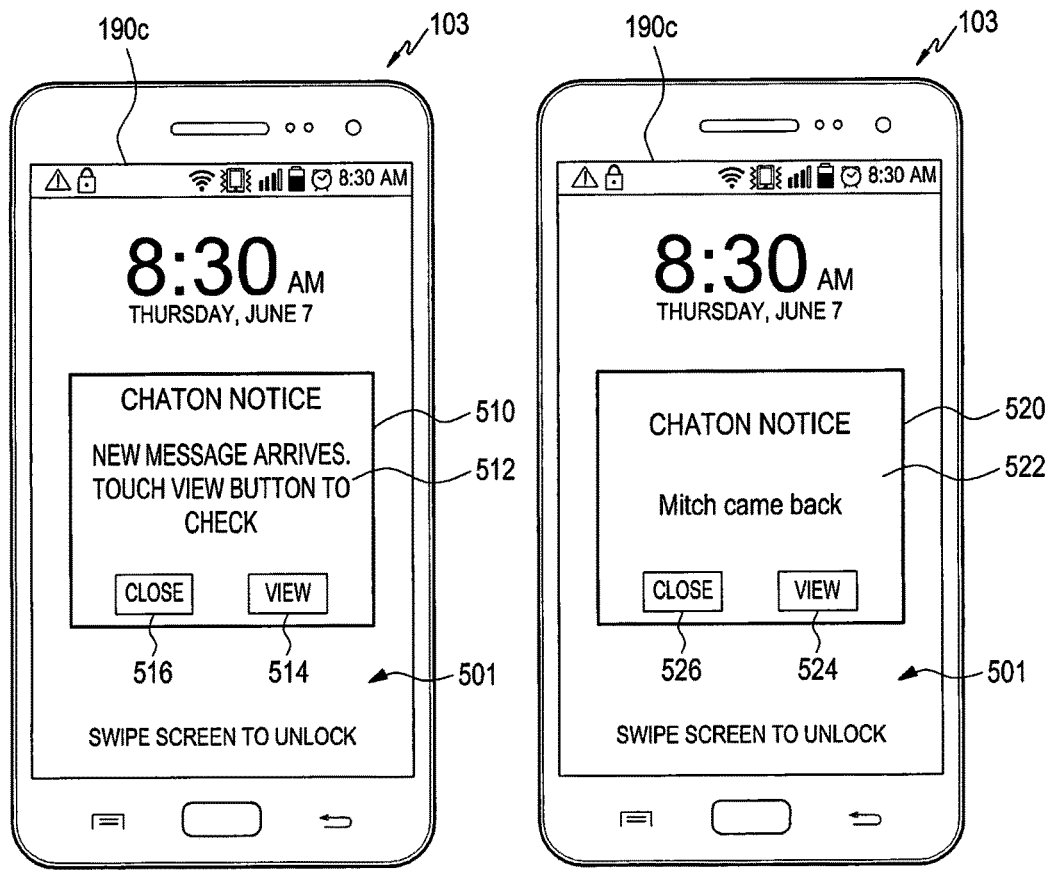
FIG. 11A illustrates when a push message does not include any message contents.
FIG. 11B illustrates when the push message includes some message contents, according to an embodiment of the present invention.

FIG. 11A illustrates a case where the push message does not include any message contents, and FIG. 11B illustrates a case where the push message includes some message contents.

Referring to FIG. 11A, the third terminal 103 displays the push message received from the second server 202 on a touch screen 190c (in this example, a lock screen 501), and the displayed push message 510 includes a message reception notification 512 which does not include message contents, a view button 514 for determining contents of the received message, and a close button 516 for closing the push message.

Referring to FIG. 11B, the third terminal 103 displays the push message received from the second server 202 on the touch screen 190c (in this example, the lock screen 501), and the displayed push message 520 includes a message reception notification 522 including some of the message contents, a view button 524 for determining contents of the received message, and a close button 526 for closing the push message.

Unlike in this example, if the second user clicks an arbitrary position or a message reception notification of a push message without using a button, connection between the third terminal 103 and the first server 200 is performed.

Referring back to FIG. 6, step S150 teaches connection between the third terminal 103 and the first server 200, in which if the user clicks a view button of a push message or closes the push message and executes a chat-on application, the third terminal 103 attempts connection with the first server 200 and the first server 200 performs authentication with respect to the third terminal 103 based on authentication information (for example, a second user account and a second password) received from the third terminal 103. If authentication is successful, connection of the third terminal 103 is permitted. Session connection between the third terminal 103 and the first server 200 is established, and a session identifier is used for data transmission between the third terminal 103 and the first server 200 after the session connection.

Step S155 teaches transmitting a read second communication message, in which the first server 200 reads the second communication message stored in the second user inbox or the third terminal inbox of the storing unit 210, and sends the read second communication message to the third terminal 103 which is currently connected.

That is, when the user clicks the view button of the push message or closes the push message and executes the chat-on application, the user may determine message contents sent by the first user on the chat-on application screen.

The first server 200 deletes the second communication message stored in the storing unit 210 after sending the second communication message to the third terminal 103.

Unlike in this example, if the third terminal 103 has been connected to the first server 200 when the first server 200 receives the first communication message, the first server 200 in real-time forwards or sends the received communication message to the third terminal 103 connected to the first server 200.

Figure 12:
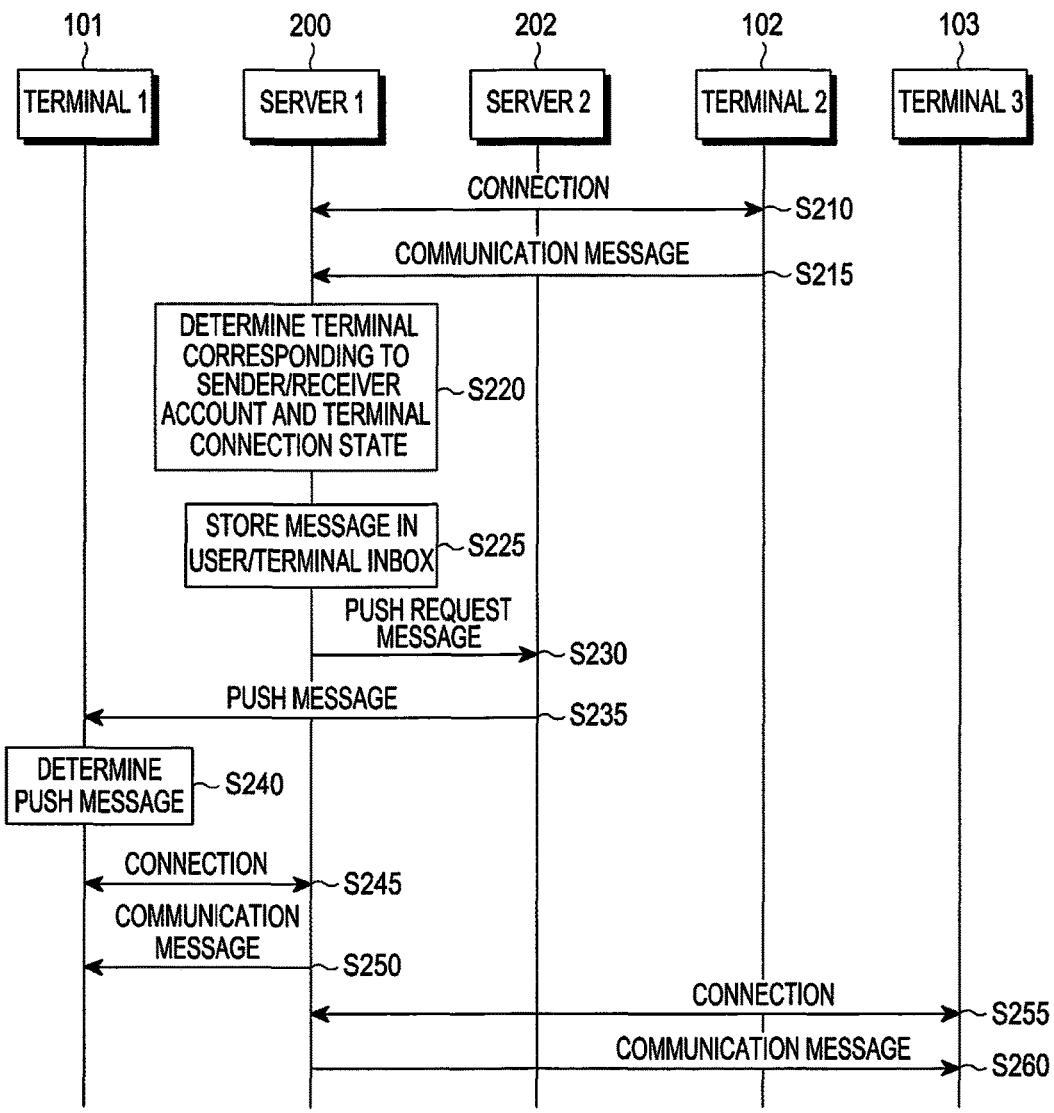
FIG. 12 is a signal flow for describing a method for synchronizing transmission messages according to an embodiment of the present invention.

FIG. 12 is a signal flow for describing a method for synchronizing transmission messages according to an embodiment of the present invention.

Step S210 teaches connection between the second terminal 102 and the first server 200, in which the second terminal 102 attempts connection with the first server 200 according to a user input or automatically, and the first server 200 performs authentication with respect to the second terminal 102 based on authentication information (for example, a second user account and a second password) received from the second terminal 102. If authentication is successful, the first server 200 permits connection of the second terminal 102. Session connection between the second terminal 102 and the first server 200 is established, and the first server 200 sends a session identifier to the second terminal 102.

Step S215 teaches sending a first communication message, in which the second user inputs message contents on the chat-on application screen, and the first chat-on application of the second terminal 102 generates and sends the first communication message including the message contents, which is destined to the first user. The first communication message includes sender information, receiver information, message contents, and at least one of a session identifier, a service/application type, and first server information. The sender information is the second user account, or a unique identifier of the second terminal, and the receiver information is the first user account, or a unique identifier of the first terminal.

Step S220 teaches determining a terminal corresponding to a sender/receiver account and a terminal connection state, in which the first server 200 determines a sender and a receiver from the first communication message received from the second terminal 202, determines account information of the second user who is a sender, and determines account information of the first user who is a receiver. The first server 200 determines, from the second user account information, that the second terminal 102 and the third terminal 103 are mapped to the second user account, and determines, from the second user account information, whether the third terminal 103 is currently connected to the first server 200. The first server 200 also determines account information of the first user, which is a receiver. The first server 200 determines, from the first user account information, that only the first terminal 101 are mapped to the first user account, and determines, from the first user account information, whether the first terminal 101 is currently connected to the first server 200.

Step S225 teaches storing a message in a user/terminal inbox, in which for message reception of the first terminal 101 that is not currently connected to the first server 200, the first server 200 generates a second communication message including message contents of the first communication message, and stores the generated second communication message in a first user inbox or a first terminal inbox. For message synch of the third terminal 103 which is not currently connected to the first server 200, the first server 200 stores the second communication message in a second user inbox or a third terminal inbox of the storing unit 210. The second communication message is the same as the first communication message, and the second communication message includes sender information, receiver information, message contents, and at least one of a session identifier, a service/application type, and first server information.

In the present invention, a sender knows that it has sent a message, such that the sender does not send a push message to a non-connected terminal corresponding to a sender account.

Step S230 teaches requesting transmission of the push message, in which the first server 200 sends to the second server 202 a push request message for requesting transmission of the push message including the message contents to the first terminal 101. The push request message includes at least one of sender information, receiver information, first server information, and message contents.

Step S235 teaches sending the push message, in which the second server 202 sends the push message to the first terminal 101. The push message includes sender information, receiver information, first server information, and message contents. The push message notifies reception/transmission of a message without displaying message contents, or includes the entire message contents or some of them.

Step S240 teaches determining the push message, in which the first user determines the push message received in the first terminal 101, and determines whether to determine the message contents or the entire push message.

Step S245 teaches connection between the first terminal 101 and the first server 200, in which if the user clicks a view button of the push message or closes the push message and executes a chat-on application, the first terminal 101 attempts connection with the first server 200, and the first server 200 performs authentication with respect to the first terminal 101 based on authentication information (for example, a first user account and a first password) received from the first terminal 101; if authentication is successful, connection of the first terminal 101 is permitted. Session connection between the first terminal 101 and the first server 200 is established, and a session identifier is used for data transmission between the first terminal 101 and the first server 200 after the session connection.

Step S250 teaches transmitting a read second communication message, in which the first server 200 reads the second communication message stored in the first user inbox or the first terminal inbox of the storing unit 210, and sends the read second communication message to the first terminal 101 which is currently connected. The first server 200 deletes the second communication message stored in the first user inbox or the first terminal inbox after sending the second communication message to the first terminal 101.

Unlike in this example, if the first terminal 101 has been connected to the first server 200 when the first server 200 receives the first communication message, the first server 200 in real-time forwards or sends the received communication message to the first terminal 101 connected to the first server 200.

Step S255 teaches connection between the third terminal 103 and the first server 200, in which the third terminal 103 attempts connection with the first server 200 according to a user input or automatically (or periodically), and the first server 200 performs authentication with respect to the third terminal 103 based on authentication information (for example, the second user account and the second password) received from the third terminal 103. If authentication is successful, the first server 200 permits connection of the third terminal 103. Session connection is established between the third terminal 103 and the first server 200, and a session identifier is used for data transmission between the third terminal 103 and the first server 200 after session connection.

Step S260 teaches sending a read second communication message, in which the second server 202 reads the second communication message stored in the second user inbox or the third terminal inbox of the storing unit 210, and sends the read second communication message to the third terminal 103 currently connected to the second server 202.

That is, the message contents sent by the second user to the first user are equally displayed on the chat-on application screens of the second terminal 102 and the third terminal 103, respectively.

The first server 200 deletes the second communication message stored in the second user inbox or the third terminal inbox, after sending the second communication message to the third terminal 103.

As is apparent from the foregoing description, by connecting a plurality of platforms and a plurality of terminals of a user to one account, the user may synchronize user's received and transmitted messages, irrespective of place and time.

Embodiments of the present invention are implemented with hardware, software, or a combination of hardware and software. Such arbitrary software is stored, whether erasable or re-recordable, in a volatile or non-volatile storage such as a Read-Only Memory (ROM); a memory such as a Random Access Memory (RAM), a memory chip, a device, or an integrated circuit; and an optically or magnetically recordable and machine (e.g., computer)-readable storage medium such as a Compact Disc (CD), a Digital Versatile Disk (DVD), a magnetic disk, or a magnetic tape. It can be seen that a storing unit included in a terminal or a server is an example of a machine-readable storage medium which is suitable for storing a program or programs including instructions for implementing the embodiments of the present invention. Therefore, the present invention includes a program including codes for implementing an apparatus or method claimed in an arbitrary claim and a machine-readable storage medium for storing such a program. The program is electronically transferred through an arbitrary medium such as a communication signal delivered through wired or wireless connection, and the present invention properly includes equivalents thereof.

The terminal or server receives and store the program from a program providing device connected in a wired or wireless manner. The program providing device includes a storing unit for storing a program including instructions for instructing the terminal or server to execute the claimed method for synchronizing messages, information necessary for the method for synchronizing messages, a communication module for performing wired or wireless communication with the terminal, and a controller for transmitting a corresponding program to the terminal at the request of the terminal or automatically.

While the present invention has been particularly illustrated and described with reference to certain embodiments thereof, various modifications or changes can be made without departing from the scope of the present invention. Therefore, the scope of the present invention is not limited to the described embodiments, should be defined by the scope of the following claims and any equivalents thereof.

What is claimed is:

1. A method for synchronizing messages among a plurality of terminals by a server, the method comprising:
    receiving, by the server, from a first terminal mapped to a first user account of a first user, a first communication message to be transmitted to a second user account of a second user, a second terminal and a third terminal being mapped to the second user account of the second user;
    in response to receiving the first communication message, identifying, by the server, the third terminal being disconnected from the server and the second user account being a receiver account for the first communication message;
    in response to identifying the third terminal being disconnected from the server and the second user account being the receiver account, sending, by the server, a message notifying reception of the first communication message to the third terminal which is mapped to the second user account of the second user and is not connected to the server, and sending, by the server, the first communication message to the third terminal, when identifying that the third terminal is connected to the server after the message notifying reception of the first communication message is sent to the third terminal;

receiving, by the server, from the second terminal, a second communication message to be transmitted to the first user account while the third terminal is not connected to the server;

in response to receiving the second communication message, identifying, by the server, the third terminal being disconnected from the server and the second user account being a sender account for the second communication message; and in response to the identifying of the third terminal being disconnected from the server and the second user account being the sender account, sending, by the server, without sending a message notifying reception of the second communication message to the third terminal, the second communication message to the third terminal after the third terminal is connected to the server.

2. The method of claim 1, further comprising:
storing the first communication message in an inbox assigned to the second user account or the third terminal.

3. The method of claim 1, wherein the message notifying reception of the first communication message comprises at least a portion of message contents of the first communication message.

4. A non-transitory machine-readable recording medium having recorded thereon a program for executing a method for synchronizing messages among a plurality of terminals by a server, the method comprising:

receiving, by the server, from a first terminal mapped to a first user account of a first user, a first communication message to be transmitted to a second user account of a second user, a second terminal and a third terminal being mapped to the second user account of the second user;

in response to receiving the first communication message, identifying, by the server, the third terminal being disconnected from the server and the second user account being a receiver account for the first communication message;

in response to identifying the third terminal being disconnected from the server and the second user account being the receiver account, sending, by the server, a message notifying reception of the first communication message to the third terminal which is mapped to the second user account of the second user and is not connected to the server, and sending, by the server, the first communication message to the third terminal, when identifying that the third terminal is connected to the server after the message notifying reception of the first communication message is sent to the third terminal;

receiving, by the server, from the second terminal, a second communication message to be transmitted to the first user account while the third terminal is not connected to the server;

in response to receiving the second communication message, identifying, by the server, the third terminal being disconnected from the server and the second user account being a sender account for the second communication message; and in response to identifying the third terminal being disconnected from the server and the second user account being the sender account, sending, by the server, without sending a message notifying reception of the second communication message to the third terminal, the second communication message to the third terminal after the third terminal is connected to the server.

5. The non-transitory machine-readable recording medium of claim 4, wherein the message notifying reception of the first communication message is sent to the third terminal through a push server.

6. A server for synchronizing messages among a plurality of terminals, the server comprising:
communication circuitry;
a storing unit configured to store user accounts and information about terminals mapped to the respective user accounts; and
a processor configured to:
receive, from a first terminal mapped to a first user account of a first user, a first communication message to be transmitted to a second user account of a second user, a second terminal and a third terminal being mapped to the second user account of the second user;
in response to the receiving of the first communication message, identify the third terminal being disconnected from the server and the second user account being a receiver account for the first communication message;
in response to identifying the third terminal being disconnected from the server and the second user account being the receiver account, control the communication circuitry to send a message notifying reception of the first communication message to the third terminal which is mapped to the second user account of the second user and is not connected to the server, and
control the communication circuitry to send the first communication message to the third terminal when identifying that the third terminal is connected to the server after the message notifying reception of the first communication message is sent to the third terminal,
receive, from the second terminal, a second communication message to be transmitted to the first user account while the third terminal is not connected to the server;
in response to receiving the second communication message, identify the third terminal being disconnected from the server and the second user account being a sender account for the second communication message; and
in response to identifying the third terminal being disconnected from the server and the second user account being the sender account, control the communication circuitry to send, without sending a message notifying reception of the second communication message to the third terminal, the second communication message to the third terminal after the third terminal is connected to the server.

7. The server of claim 6, wherein the server sends the message notifying reception of the communication message to the first receiving terminal through a push server.

8. The server of claim 6, wherein the storing unit comprises inboxes assigned to the user accounts or terminals mapped to respective user accounts, and the controller stores the communication message in an inbox assigned to the second user account or the first receiving terminal.

9. A third terminal comprising:
communication circuitry; and
a processor configured to:
in response to the third terminal being disconnected from a server and a second user account of a second user being a receiver account for a first communication message, receive a message notifying reception of the first communication message from the server, wherein the server receives, from a first terminal mapped to a first user account of a first user, the first communication message to be transmitted to the second user account, a second terminal and the third terminal being mapped to the second user account of the second user;
in response to receiving the message notifying reception of the first communication message, control a screen of the third terminal to display the message notifying reception of the first communication message;
control the communication circuitry to connect to the server and receive the first communication message from the server after the message notifying reception of the first communication message is received; and
in response to the third terminal being disconnected from the server and the second user account being a sender account for a second communication message, receive without receiving a message notifying reception of the second communication message from the server, the second communication message from the server after the third terminal is connected to the server,
wherein the server receives, from the second terminal, the second communication message to be transmitted to the first user account while the third terminal is disconnected from the server.

10. The third terminal of claim 9, wherein the message notifying reception of the first communication message comprises at least a portion of message contents of the first communication message.

11. The third terminal of claim 9, wherein the processor further controls the communication circuitry to connect to the server according to a user input to the third terminal.

12. The third terminal of claim 9, wherein the message notifying reception of the first communication message is a push message, and
wherein the third terminal receives the first communication message through a session connection with the server.

13. A non-transitory machine-readable recording medium having recorded thereon a program for executing a method for synchronizing messages by a third terminal, the method comprising:
in response to the third terminal being disconnected from a server and a second user account of a second user being a receiver account for a first communication message, receiving a message notifying reception of the first communication message from the server, wherein the server receives, from a first terminal mapped to a first user account of a first user, the first communication message to be transmitted to the second user account, a second terminal and the third terminal being mapped to the second user account of the second user;
in response to receiving the message notifying reception of the first communication message, controlling a screen of the third terminal to display the message notifying reception of the first communication message;
controlling communication circuitry of the third terminal to connect to the server and receive the first communication message from the server after the message notifying reception of the first communication message is received; and
in response to the third terminal being disconnected from the server and the second user account being a sender account for a second communication message, receiving, without receiving a message notifying reception of the second communication message from the server, the second communication message from the server after the third terminal is connected to the server,
wherein the server receives, from the second terminal, the second communication message to be transmitted to the first user account while the third terminal is disconnected from the server.

14. The non-transitory machine-readable recording medium of claim 13, wherein the third terminal receives the message notifying reception of the first communication message from a push server.

15. The non-transitory machine-readable recording medium of claim 13, wherein the third terminal connects to the server according to a user input to the third terminal.

16. The non-transitory machine-readable recording medium of claim 13, wherein the message notifying reception of the first communication message is a push message, and
wherein the third terminal receives the first communication message through a session connection with the server.

17. The method of claim 1, wherein the third terminal executes a real-time communication application that is configured to:
when the third terminal is not connected to the server, receive the message notifying reception of the first communication message; and
receive the second communication message without receiving a message notifying reception of the second communication message.

18. The third terminal of claim 9, wherein the third terminal executes a real-time communication application that is configured to:
when the third terminal is not connected to the server, receive the message notifying reception of the first communication message; and
receive the second communication message without receiving a message notifying reception of the second communication message.

* * * * *